United States Patent [19]

Sutherland

[11] Patent Number: 4,993,766
[45] Date of Patent: Feb. 19, 1991

[54] MECHANICAL GRIPPING AID FOR HANDICAPPED PERSONS

[76] Inventor: John W. Sutherland, 3071 Cascade Ct., Camino, Calif. 95709

[21] Appl. No.: 465,936

[22] Filed: Jan. 16, 1990

[51] Int. Cl.$^5$ .............................................. B25J 1/04
[52] U.S. Cl. ..................................... 294/19.1; 294/25
[58] Field of Search ................ 294/19.1, 22, 23, 23.5, 294/24, 25, 49, 50.6, 50.7, 50.8, 50.9; 623/57, 58, 59, 60, 61, 62, 63

[56] References Cited

U.S. PATENT DOCUMENTS

| | | | |
|---|---|---|---|
| 847,200 | 3/1907 | Neddo | 294/22 |
| 2,989,334 | 6/1961 | Browne | 294/19.1 |
| 3,091,491 | 5/1963 | Adler | 294/22 |
| 3,194,597 | 8/1962 | Lasch, Jr. | |
| 4,374,600 | 2/1983 | van Zelm | |
| 4,613,179 | 9/1986 | van Zelm | |

Primary Examiner—Margaret A. Focarino
Assistant Examiner—Dean J. Kramer

[57] ABSTRACT

A flat bar having a closable jaw structure at one end for grasping objects, and an arm attachment loop at an opposite end of the bar. Attached between the jaw and the arm attachment loop is a hinged hand attachment loop. A linkage rod attaches between the hinged hand attachment loop and the jaw structure. The device utilizes the action of the wrist to operate the action of the grasping jaws, completely eliminating the use of the fingers for operation. The arm and hand attachment loops provide releasable attachment of the device to the forearm of the user. The one-handed gripping aid leaves the other hand available for bracing while the user reaches for the objects.

1 Claim, 3 Drawing Sheets

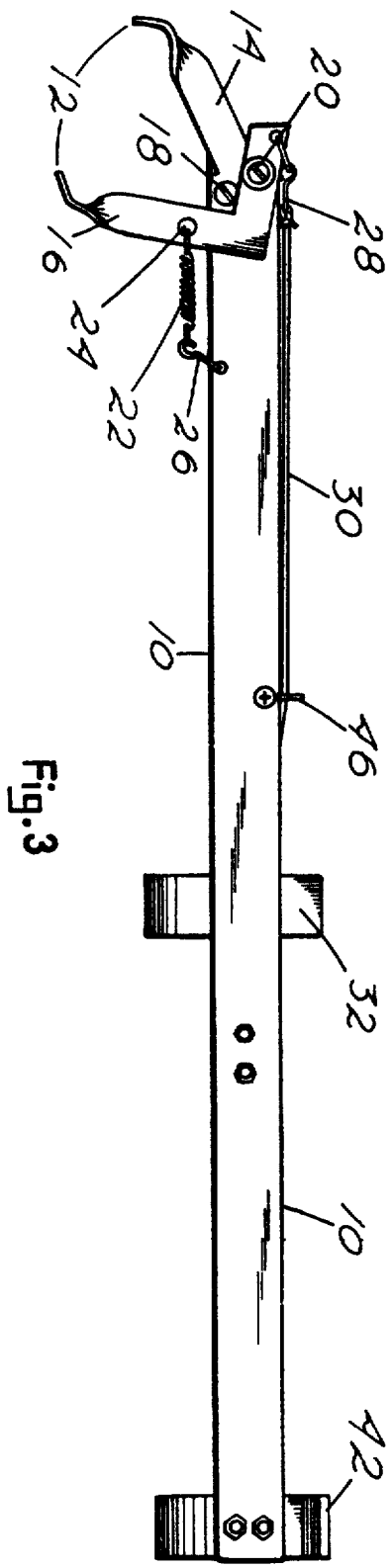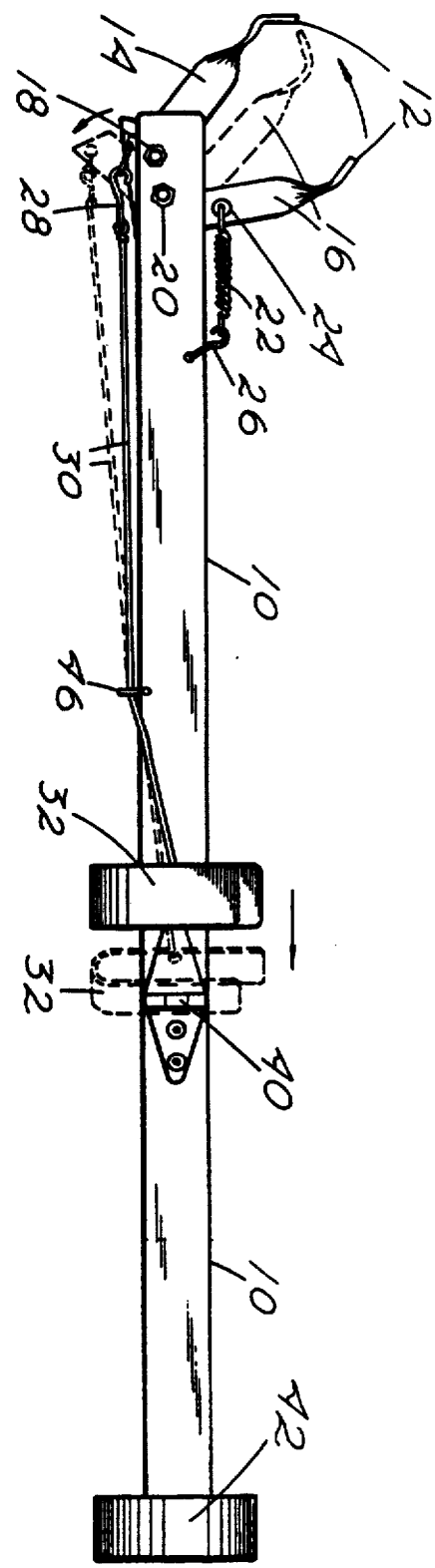

MECHANICAL GRIPPING AID FOR HANDICAPPED PERSONS

BACKGROUND OF THE INVENTION

1. Field of the Invention

This invention relates to equipment used to extend the reach, and to allow gripping of objects by handicapped persons. More precisely the invention relates to one-handed manually operated devices which do not require the use of the fingers for gripping or manipulating the clamping device.

2. Description of the Prior Art

Many handicapped or disabled people, especially those confined to a wheelchair or bed, find reaching for or lifting certain items, difficult or even impossible due to limited strength and mobility. Those people having hands and fingers affected with various dysfunctions which limit the strength and range of motion of the fingers find lifting and grasping items especially difficult.

There exist many reaching aids and clamping devices for the handicapped found in the prior art. Several devices are power operated by electricity, compressed $CO_2$ cartridges or other power sources and cannot be operated manually and therefore are not included in the same category as my manually operated device. Of the manually operated past art reaching aids, the majority of the devices require the use of the hand and fingers to grip and or operate the device. The two following past art patents, examined in a search conducted in the U.S. Patent Office, are indicative of this category of reaching aids: the U.S. patent issued to van Zelm on Feb. 22, 1983, U.S. Pat. No. 4,374,600, illustrates a hand-grip lock-type member requiring the use of the entire hand to successfully operate the device. The Lasch, Jr. device, U.S. Pat. No. 3,194,597, shows a hand held pick-up tool having a shovel like gripper which is activated by a finger loop.

Another U.S. patent held by van Zelm, U.S. Pat. No. 4,613,179, teaches a griping device having a three point lateral restraint including a thumb support element, a wrist brace and an arm support element. Very little strength or mobility of the hand and fingers is required to support this device. The clamping member however, is actuated by a lanyard which is operated by the free hand of the user. This device cannot be operated by one hand alone, as my device, which tends to eliminate use by those having little or no function of the free hand.

Therefore, none of the past art devices can be operated with one hand by a person having very limited gripping strength in his hands and fingers. Either the entire hand must be used to grip and hold the device or one or more of the fingers must be maneuverable to operate the gripping member. Therefore none of the previously mentioned devices would prove useful to someone having very limited use of his fingers and or limited use of only one hand. My device overcomes these disadvantages and provides a new and novel gripping aid for handicapped persons.

SUMMARY OF THE INVENTION

I have provided a one-handed gripping aid for handicapped people comprised of an elongated narrow flat bar having a fist end and an oppositely disposed second end. Two opposing jaws are affixed to the first end of the bar and the second end is adapted for attachment to a human arm. One opposing jaw is affixed stationary and the other is pivotal, being operated by a linkage member or lanyard attached to the hand loop which is hingidly affixed to the bar between the first and second ends. In use, the person first inserts his hand and arm, palm side down, through a rigid, but bendable, arch located endwardly on the second end of the bar. The arm is advanced until the palm of the hand is inserted into the hand loop and the forearm is inserted snugly within the arch. The arch can be bent to increase or decrease the internal diameter to accommodate for various size differences of the upper forearm. This arch, along with the pivotal hand loop, serves as the arm attachment means of the device and is designed to stabilize the arm onto the device. This type of attachment means dissipates the overall weight of the device over the length of the forearm, making lifting and maneuvering of the bar easier than if affixed only to the hand or wrist. By stabilizing the device to the user's forearm, the need for manual hand gripping force is eliminated. When the wrist is kept in straight alignment with the forearm, the bar essentially becomes an extension of the hand. To operate the movable jaw the user flexes his wrist upward away from the bar, using the surface of the bar to brace against the inner aspect of the arm, pivoting the hand loop backward. The wrist serves as a fulcrum of the action. The upward pivot of the hand loop draws the attached lanyard backward causing the pivotal jaw to close or adduct towards the stationary jaw, grasping the object. An extension spring is affixed to the pivotal jaw and serves as a spring biasing means to return the pivotal jaw to its abducted or open state and maintains that position when not in use.

My gripping device is operable by a person having limited or no use of his fingers, using only the flexion and extension of his wrist with the hand loop inserted over the mid portion of the hand between the fingers and wrist. Technically, my device would even be operable by someone completely missing his fingers. The opposite hand of the person is also free which is often needed for bracing against a stationary surface, such as a wheelchair, while the user reaches outward with the gripping device. The jaws of the gripping aid can even be adapted to attachment with various tools and household items such as a broom, rake or mop.

Therefore, it is a primary object of my invention to provide a gripping aid for picking up objects by handicapped persons which is operable by the flexion and extension of the wrist only, totaling eliminating the use of the fingers.

Another object of the invention is to provide a gripping aid which is operable with only one hand.

A further object of the invention is to provide a light weight gripping aid which is quick and easy to apply and use.

An even further object of the invention is to provide a gripping aid capable of size adjustment to accommodate size differences, especially of the forearm.

Other objects and advantages of the invention will provide apparent with a reading of the remaining specification with comparison with the accompanying numbered drawings.

BRIEF DESCRIPTION OF THE DRAWINGS

FIG. 2 is a top view thereof, illustrating the range of movement of the pivotal jaw and hand loop.

FIG. 3 is a bottom view thereof.

DESCRIPTION OF THE PREFERRED EMBODIMENT

Figure 1:
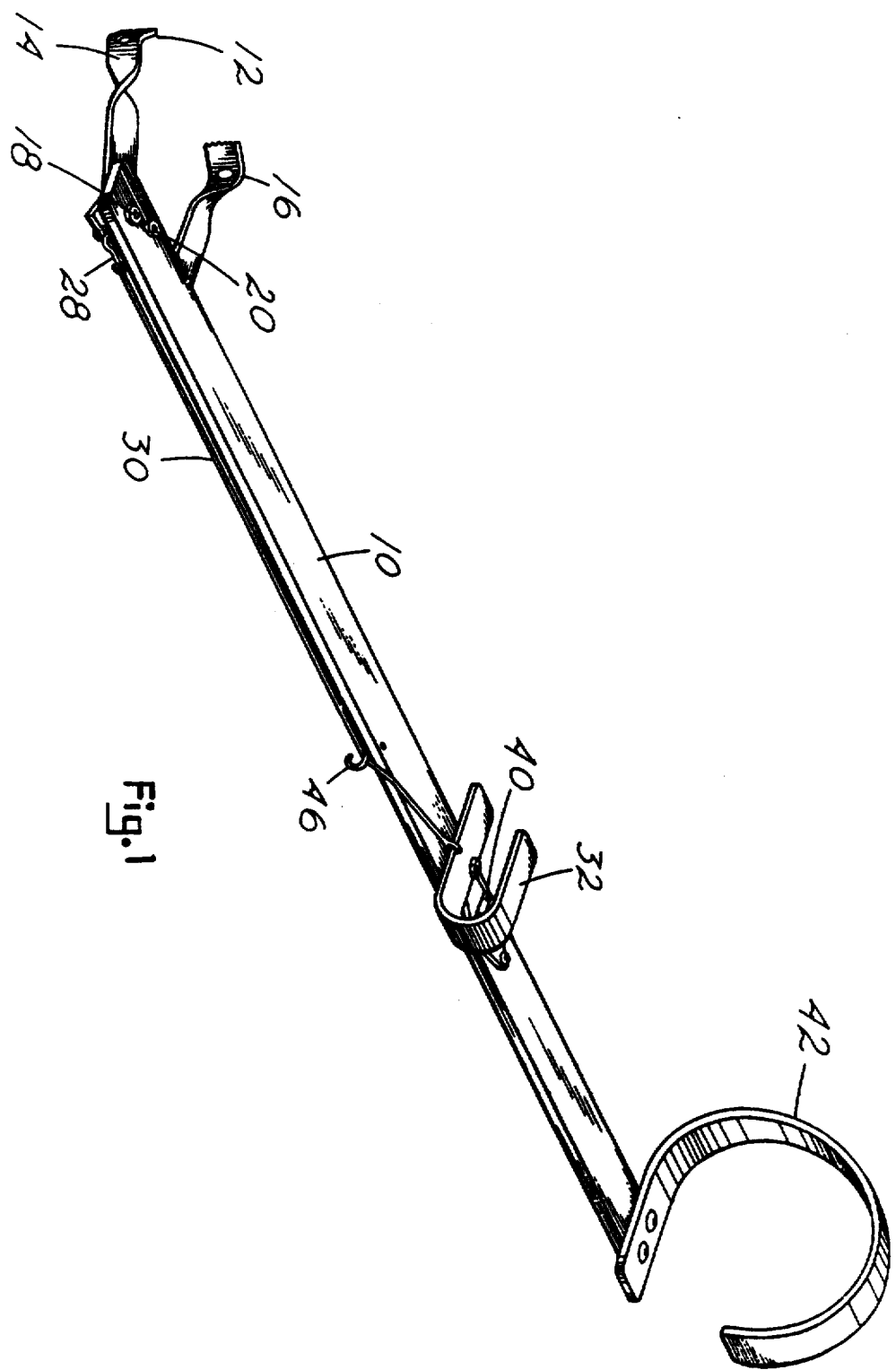
FIG. 1 is a perspective frontal view of the gripping aid.
Figure 4:
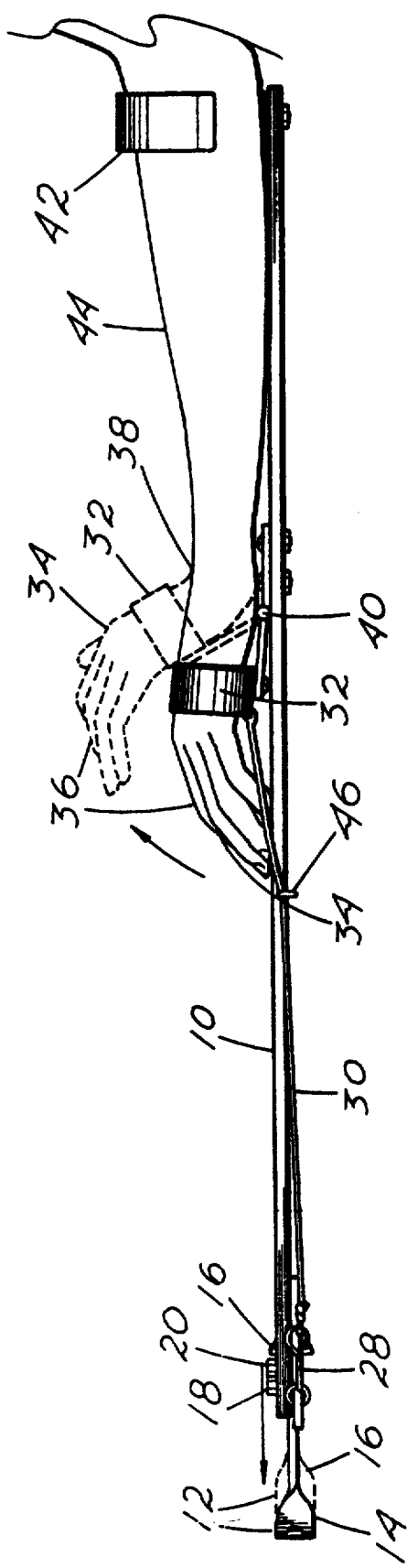
FIG. 4 is a left side view of the invention in use with the person's forearm inserted into the forearm attachment loop and the hand inserted into the hand loop. The dotted outline represents the backward flexion of the hand which pivots the hand loop backward, retracting the lanyard and closing the pivotal jaw.

Referring now to the drawings and to FIG. 1 where the preferred embodiment of the invention is illustrated. The gripping aid consists of a base having a first and second end, comprised of a narrow elongated flattened metal bar 10 onto which is affixed a gripping means and an arm attachment means. Although bar 10 is described and illustrated as a flat metal bar, almost any elongated shape could be substituted, such as a cylindrical or square bar. Also while a light weight metal such as aluminum is the preferred material of manufacture, other materials such as wood or plastic can also be used. The gripping means consists of two opposing metal jaws 12, one being stationary jaw 14 and the other pivotal jaw 16. Both jaws 12 are affixed to the first end of bar 10 with the arm attachment means affixed to the opposite second end. Stationary jaw 12 is basically a small elongated rectangular flat horizontal metal band having a first end twisted and positioned perpendicular to the opposite second end. The horizontal second end of jaw 14 is affixed to the first end of bar 10 with the twisted distal end thereof projecting outward. The horizontal second end of stationary jaw 14 is permanently affixed with bolt 18 to the bottom surface left hand corner of bar 10, and projects outward in an approximately forty-five degree angle when viewed from the bottom surface, as shown in FIG. 3. Pivotal jaw 16 is a flat right-angled metal section having one twisted end similar to stationary jaw 14. The opposite flat right-angled end thereof is pivotally affixed with pivotal bolt 20 to the under surface of the second end of bar 10, partially overlapping stationary jaw 14. As shown in FIG. 3, pivotal bolt 20 is positioned approximately midway between the end of pivotal jaw 16 and the right angled corner. Both distal ends of jaws 12 are slightly angled inward towards each other, best shown in FIG. 2 and 3, with the endward edges serrated for better gripping, as seen in FIG. 1. Pivotal jaw 16 is maintained in an open or abducted piston with extension spring 22, shown in FIG. 2 and 3. Extension spring 22 is attached on one end through extension spring aperture 24 on pivotal jaw 16 and on the opposite end to extension spring hook 26 positioned on the left lengthwise edge of bar 10, as viewed from the bottom surface of FIG. 3. The opposite end of pivotal jaw 16 adjacent pivotal bolt 20 is also affixed with a hook known as lanyard hook 28. Lanyard hook 28 is affixed to a linkage system which is in this illustration is depicted as lanyard 30. Lanyard 30 is shown as a flexible cord but could also be substituted for a rigid metal rod, a metal cable or other suitable linkage means. The linkage system could also conceivably be internally housed if bar 10 were manufactured of a hollow cylindrical member. Lanyard 30 extends from its attachment point to pivotal jaw 16 through a guide hook 46 to where the opposite end of lanyard 30 is affixed to a portion of the arm attachment means, pivotal hand loop 32. Hand loop 32 is a horizontal U-shaped metal band sized for positioning over hand 34 between fingers 36 and wrist 38. Hand loop 32 is affixed transversely to bar 10 by hinge 40 with the open end facing right, as seen in FIG. 1. The second end of bar 10 is affixed with the second portion of the arm attachment means, arch 42. Arch 42 is an elongated curved metal section affixed transversely to the second end of bar 10. The left side of arch 42 is left free and unattached, as shown in FIG. 1, and can be manually bent to alter the interior diameter if desired.

In use, the person first inserts hand 34 through arch 42 and advances hand 34 until it is positioned within hand loop 32. The mid-portion of hand 34, specially that area between fingers 36 and wrist 38, is positioned palm downward into hand loop 32. Arch 42 can be adjusted to fit snugly over the upper end of forearm 44, and hand loop 32 should be fairly snug over hand 34. The user can now direct the first end of bar 10 with attached jaws 12 in almost any direction without having to grasp bar 10 with fingers 36. To manipulated jaws 12, the user bends hand 34 backward towards arch 42 which retracts lanyard 30 and adducts or closes pivotal jaw 16 against stationary jaw 14, grasping the object between the two. As the object is lifted with bar 10, hand 34 is still flexed, with wrist 38 braced against the surface of bar 10, maintaining pivotal jaw 16 in a closed position. To release the grasp of jaws 12 on the object hand 34 is rotated downward toward bar 10, releasing jaws 12.

This grasping aid is light weight and easy to use, even for a person with very limited use of his fingers. Since only one hand is needed to apply and use the device, the free hand can be used to brace the person as he reaches for the object. There are no ties or belts to maintain the device in place which therefore facilitates one handed usage. The specific action of this device, different from that of the past art, is that the grasping action is accomplished totally without the use of fingers 36, and with the use of only one hand.

Although the gripping aid has been illustrated and described in detail in the drawings and specification, various alterations and modifications can be made in design and structure of the device and still provide the desired function. Several such anticipated modifications are hereinafter noted: even though the device is shown in use with the left hand 34 it can also be used with the right hand 34. The open side of arch 42 and hand loop 32 can be reversed during manufacture to better accommodate a custom right or left hand fit. Hand loop 32 and arch 42 can also be structured in various other shapes, such as an enclosed loop for hand loop 32 or an enclosed arch 42, and still function adequately. Padding can also be applied to hand loop 32, arch 42 and even portions of bar 10 for the comfort of the user. Pivotal hand loop 32 can also be movably affixed to bar 10 to allow repositioning along the length of bar 10 to adjust for various forearm 44 lengths of the user. Bar 10 itself can be of almost any length and is not limited to a linear structure. Angled joints, fixed and movable, can be incorporated into bar 10 to help accommodate various unexpected applications. Although I have specifically described various forms of anticipated modifications which are possible with my device, the invention is not limited thereto.

What I claim as my invention:

1. A manually operated mechanical device for aiding a handicapped person in reaching and picking up objects, said device adapted to one-handed usage being operable by a person through movement of the person's wrist and arm; said device comprising:

an elongated narrow bar, said bar having a first end and an oppositely disposed second end, said first end affixed with a moveable gripping means having means to releasably tighten onto an object, a U-shaped hand loop with one of its legs affixed to a hinge means, the hinge means pivoted to said bar about an axis which is transverse to said bar with said hand loop generally centered over said bar, said hand loop further positioned between said first end and said second end of said bar, linkage means connected to and between said gripping means and said hand loop, said linkage means providing means for actuating movement in said gripping means by way of pivotal movement in said hand loop away from said bar and toward said second end of said bar, said hand loop sized to fit snugly around a person's hand with said hand loop adapted to fit over the person's hand between the wrist and the fingers, an arm attachment means affixed to said second end of said bar, said arm attachment means sized for removable attachment to a forearm portion of a person's arm; said hand loop and said arm attachment means placed in relative positioning to each other and said bar to allow positioning of said hand loop over a person's hand simultaneous with attachment of said arm attachment means attached to the person'forearm with the attachment of said device positioning the person's wrist and forearm in parallel alignment with and against said narrow bar.

* * * * *